Aug. 29, 1961 — P. H. BARTLETT — 2,998,261
AIR SUSPENSION SYSTEM FOR TANDEM AXLES
Filed July 15, 1959 — 2 Sheets-Sheet 1

INVENTOR.
Percy H. Bartlett,
BY Parker & Carter
Attorneys.

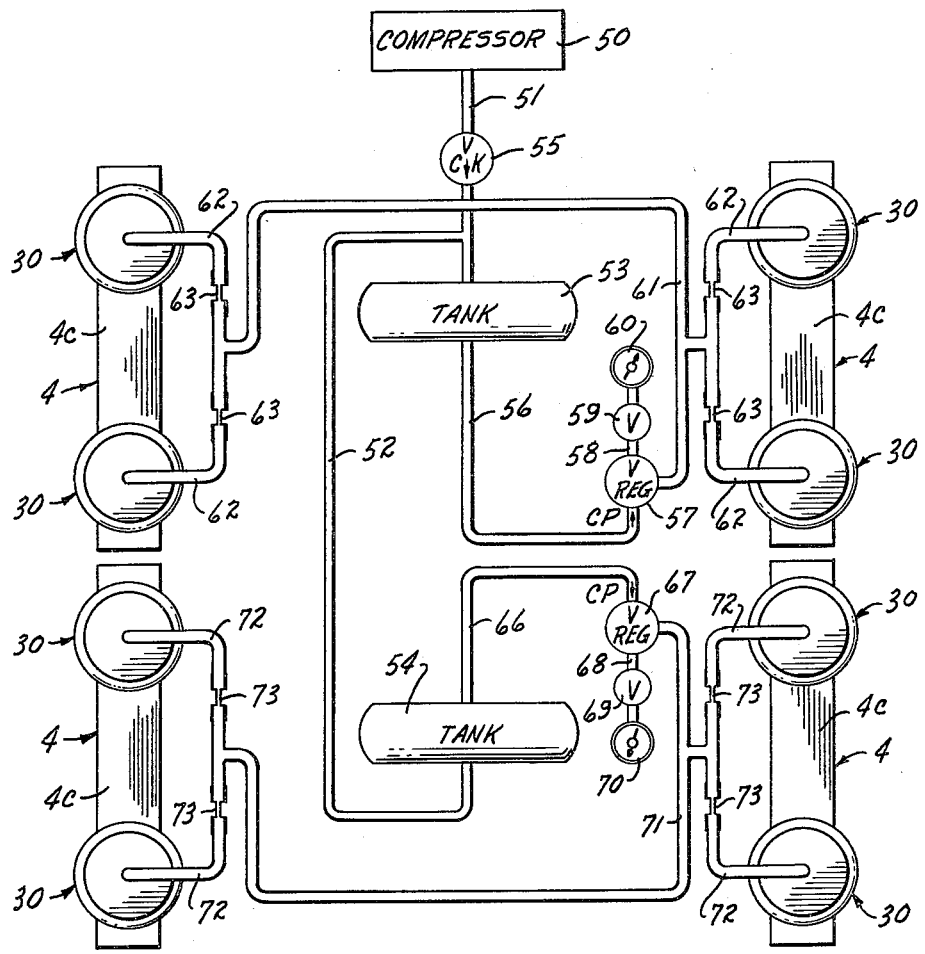

United States Patent Office 2,998,261
Patented Aug. 29, 1961

2,998,261
AIR SUSPENSION SYSTEM FOR TANDEM AXLES
Percy H. Bartlett, Riverside, Ill., assignor to Bartlett Trailer Corporation, Chicago, Ill., a corporation of Illinois
Filed July 15, 1959, Ser. No. 827,343
4 Claims. (Cl. 280—81)

This invention relates to suspension systems and has particular relation to an air suspension system usable in relation to vehicle such as truck trailers, and the like.

One purpose of the invention is to provide an air suspension unit for vehicles employing a captive air system.

Another purpose is to provide a suspension unit for vehicles in which air is employed as a suspension medium.

Another purpose is to provide a suspension unit for vehicles in which air is employed as a suspension medium without the requirement for replenishment of air in the system while the vehicle is in motion.

Another purpose is to provide a suspension unit for vehicles in which a cushioning means is supplied in relation to lateral sway of the vehicle with which the unit is employed.

Another purpose is to provide a suspension unit for dual-axle vehicle in which individual pontoons are mounted solidly on individual axles and are in turn cushioned by air chambers.

Another purpose is to provide a suspension unit for dual-axle vehicles in which a source of suspension fluid is supplied for each individual axle.

Another purpose is to provide a suspension system for dual or tandem-axle vehicles wherein regulating means is supplied for controlling a fluid suspension pressure in relation to the payload of the vehicle.

Another purpose is to provide a fluid suspension unit for tandem-axle vehicles wherein fluid pressure is individually supplied and regulated in relation to individual axles.

Another purpose is to provide a fluid suspension system for vehicles including pontoons secured to axles and anti-sway members secured to the vehicle and slidably engaging the pontoons.

Another purpose of the invention is to provide a fluid suspension system for vehicles wherein radius rods are adjustably associated with the pontoons and axles of the vehicle and the system and with the vehicle itself.

Another purpose is to provide a fluid pressure suspension system for vehicles capable of effecting complete suspension of the vehicle.

Another purpose is to provide a readily ascertainable indicating means in a fluid pressure suspension system for vehicles.

Another purpose is to provide a fluid suspension system capable of complete vehicle suspension without the necessity for the employment of pressure leveling and relief valves operable while the vehicle is in motion.

Another purpose is to provide a fluid suspension system effective to prevent loss of fluid and reduction of fluid from the vehicle fluid pressure system.

Another purpose is to provide a vehicle suspension system effective without the employment of known-type shock absorbers.

Another purpose is to provide a fluid suspension system for vehicles wherein the fluid system is entirely separate from the brake pressure system of the vehicle.

Another purpose is to provide a fluid suspension system for vehicles requiring no increase in capacity of the normal vehicle pressure system.

Other purposes will appear from time to time during the course of the specification and claims.

I illustrate my invention, more or less diagrammatically, in the accompanying drawings, wherein:

FIGURE 3 is a schematic representation of the air system employed with the invention; and FIGURE 4 is a detail view, in partial cross section and on an enlarged scale, of an element of my invention.

Like parts are indicated by like numerals throughout the specification and drawings.

Figure 2:
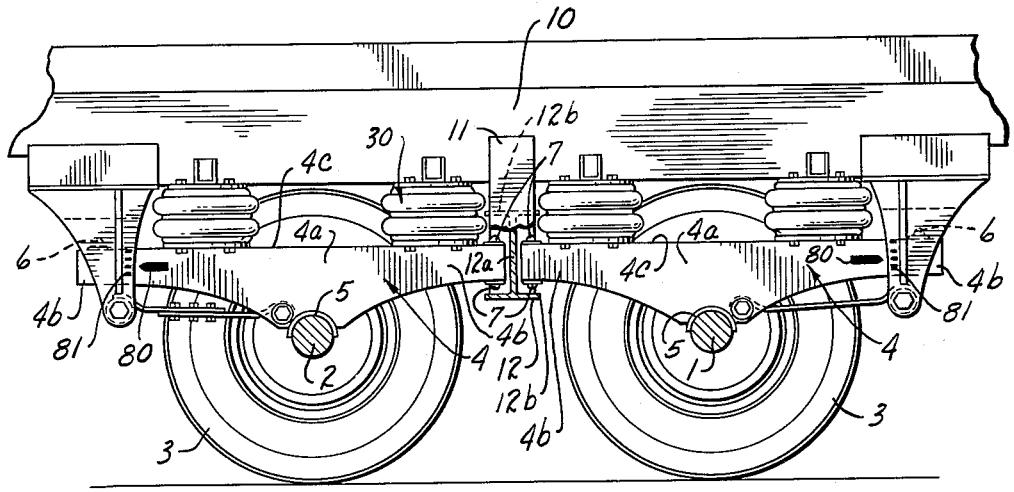
FIGURE 2 is a side elevation in partial cross section, with parts removed for clarity.
Figure 1:
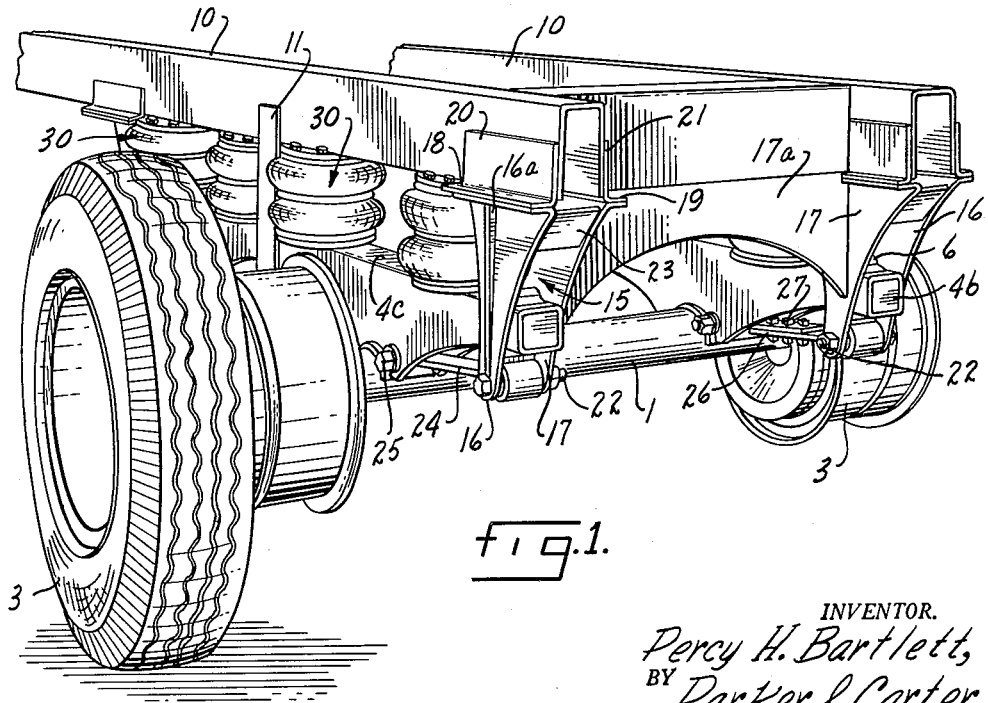
FIGURE 1 is a perspective view of elements of the fluid suspension system of the invention.

Referring now to the drawings, and particularly to FIGURES 1 and 2, the numerals 1, 2 indicate tandem axles of the type employed, for example, on truck trailers of known construction. The axles 1, 2 have wheel elements at their opposite ends, as is well known, the elements being indicated generally herein by the numeral 3. A pair of rigid pontoons, each indicated by the numeral 4, is mounted on each of the axles 1, 2, one pontoon 4 being mounted inside and adjacent each set of wheels. Thus, the axle 1 has a pair of pontoons 4 seated thereon, one of said pontoons being positioned adjacent one end of axle 1 and the other of said pontoons being positioned adjacent the opposite end of axle 1. It will be understood that the same thing is true of axle 2, one of the pontoons 4 associated therewith being illustrated in FIGURE 2. Each of the pontoons 4 is fixedly secured to its associated axle as, for example, by welding, indicated generally at 5.

Each of the pontoons 4 has a central enlarged portion 4a which seats upon its associated axle and each of the pontoons 4 extends laterally, fore and aft, of its associated axle a substantial distance, the extending portions of the pontoons 4 being indicated at 4b. It will be observed that the wings 4b of the pontoons 4 are generally rectangular in cross section, having a pair of parallel, substantially vertically positioned sides. Similarly, the pontoons 4 have a substantially horizontal upper surface 4c.

It will be observed that the rear set of pontoons is longitudinally aligned with the pontoons seated upon the forward axle and that the forwardly extending wings 4b of the rear pontoons 4 extend to a point closely adjacent the rearwardly extending wings 4b of the forward pontoons 4.

The rearwardly extending wings 4b of the rear set of pontoons 4 and the forwardly extending wings 4b of the forward set of pontoons 4 have positioned on their upper surfaces, and adjacent their ends, bumper elements 6 which may be formed of a material having the properties of rubber. The forwardly extending wings 4b of the rear set of pontoons 4 and the rearwardly extending wings 4b of the forward set of pontoons 4 similarly have bumper elements 7, likewise formed of material having the properties of rubber. The bumper elements 7 are positioned on the upper and lower surfaces of the wings 4b closely adjacent the ends thereof, as clearly shown in FIGURE 2.

Longitudinally extending vehicle frame members or beams 10 overlie the pontoons 4, the lefthand member 10 overlying one set of forward and rear pontoons and the righthand member 10, as the parts are shown on the drawings, overlying the other set of forward and rear pontoons 4.

Secured, as by welding, to the members 10, and extending downwardly therefrom, is a pair of anti-sway side plates 11. The plates 11 extend downwardly from their respective members 10 at a point intermediate the axles 1, 2 and in lateral or masking alignment with the adjacent ends of forward and rear pontoons 4, as best seen in FIGURE 2. While only one plate 11 is illustrated, it will be understood that a second plate 11 is in alignment therewith. Secured to the plates 11 and extending therebetween beneath the vehicle frame 10 is an I-beam 12, the beam web 12a extending between the adjacent end surfaces of forward and rear pontoons 4 and the upper and lower cross members 12b of I-beam 12 overlying, and underlying, respectively, the bumper elements 7, above described. Between beams 10 the member 12 extends in the form of an arch.

A set of four anti-sway bracket elements is secured to main frame beams 10, the anti-sway elements being indicated generally by the numeral 15. Since the elements 15 are substantially identical it will suffice, for convenience, to describe one such element in detail, it being understood that one element 15 is secured to beams 10 above each of the rearwardly extending wings 4b of the rear pontoons 4 and each of the forwardly extending wings 4b of the forward pontoons 4.

The members 15 each comprise a set of spaced, parallel side plates 16, 17, each outer plate 16 having a vertical strengthening rib, such as indicated at 16a, extending from its outer surface. The plates 16, 17 may have their upper ends laterally disposed to form mating flanges with similarly disposed flanges 18, 19, respectively, on joiner plates 20, 21 which are in turn secured to opposite side surfaces of the beam 10. An arch member, or structural support 17a extends between and is secured to the opposed surfaces of inner plates 17. It will be observed that side plates 16, 17 are spaced apart a distance just sufficient to slidably receive the associated wing 4b of pontoon 4. The plates 16, 17 have a cross member 22 extending between their lowermost ends beneath the terminal portion of pontoon wing 4b positioned between plates 16, 17. A buffer plate 23 extends between plates 16, 17 adjacent their upper edges and downwardly beneath beam 10 to serve as a contact abutment or stop element for bumper 6 and to limit upward movement of pontoon wing 4b.

A radius rod, which may take the form of a leaf spring member 24, has one of its ends secured to plates 16, 17, as by being turned upon itself about element 22 extending therebetween. The opposite end of member 24 is secured to pontoons 4 by means of a suitable connector such as the member shown at 25. It will be observed that the rod 24 has its inner end secured to pontoon 4 immediately adjacent the axle, 1 or 2, to which pontoon 4 is itself fixedly secured. As indicated at 26, the radius member 24 may be rendered adjustable by dividing it into two portions, each of the resulting portions having one of its ends secured to either pontoon 4 or to plates 16, 17. The opposite ends of the two radius member portions are arranged in overlapping relationship with suitable connectors 27 removably securing the overlapping radius rod portions together, a plurality of apertures being selectively provided for varying the amount of overlap of the mating portions of member 24.

Seated on the upper surface 4c of each of the pontoons 4, and longitudinally spaced thereon for location adjacent the opposite ends of each pontoon 4, is a pair of air pressure chambers. Since the air pressure chambers are identical, only one, for convenience, will be described. The chamber indicated generally at 30, for example, may be considered as comprising a base plate 31 secured by any suitable means to the upper surface 4c of the pontoon 4. Secured to the upper surface of plate 31 is a clamping plate 32, the circumferential edge of which is turned upwardly and then inwardly upon itself to grip a lower circumferential bead 33 formed on the balloon member 34 of the air chamber 30. The balloon member 34 comprises a hollow tubular element formed of a flexible material having the properties of rubber, for example, and having its tubular walls impervious to the flow of a fluid, such as air, under pressure. The member 34 has its intermediate portion reduced to flow through a confining metallic ring 35, the effect of which is to restrict the outward extension of the wall of member 34 to those portions above and below the ring 35. At its opposite end from the bead 33, the wall of member 34 has a second bead 36 which is in turn clamped within an upper clamping plate 37. The plate 37 has secured to its other upper surface an upper plate 38 which is in turn secured to the beam 10 of the vehicle with which my invention may be employed, the plate 38 being secured, for example, by means of bolts 39 to beam 10.

Referring now to FIGURE 3, I illustrate schematically a fluid pressure supply and control system. A source of fluid pressure is illustrated at 50, and is provided for initial supply of fluid pressure through conductor 51 and branch conductor 52 to a pair of fluid pressure storage tanks or reservoirs 53, 54. It will be understood that the pressure source 50 is employed for the initial filling of tanks 53, 54, a check valve 55 being inserted in conductor 51 to prevent reverse flow of pressure therethrough. The source 50 will normally take the form of the compressor supplied as standard equipment with truck tractors and the conductor 51 extends from the tractor to the trailer with which the fluid suspension system of my invention is employed.

The individual captive air system for the forward set of pontoons includes the tank 53, having a fluid pressure outlet conductor 56 connected thereto. A manually operable pressure regulator valve 57 is connected in the line 56. A branch conductor 58 is connected to regulator 57 and has a manually operable dump valve 59 connected therein. The branch 58 also has connected thereto an indicator 60. A conductor 61 is connected to regulator 57 to receive fluid pressure supplied therethrough from conductor 56. Branch conductors 62 extend from conductor 61 to each of the air pressure chambers 30. As best seen in FIGURE 4, a restrictor 63 is positioned in the lines or conductors 62 adjacent the chambers 30, the purpose of which will appear hereinbelow.

An identical, and entirely separate, system formed of tank 54, conductor 66, regulator valve 67, conductor 68, relief or duct valve 69, indicator 70, conductor 71, branch conductors 72, and restrictors 73, is provided for the rear set of pontoons 4.

An indicator marker 80 may be painted or otherwise displayed on an outer sidewall of those pontoon wings 4b which are slidably received in brackets 15 and side plates 16 may have gradation marks 81 similarly displayed on their outer surfaces adjacent the mark 80. Thus, while the vehicle operator will normally set the pressure in the suspension system of my invention at the precise amount desired by reading indicator 60—70, a broad guidance means effective to permit rapid setting of such pressure within safe but broader limits is provided by indicator markings 80—81.

Whereas the preferred form has been shown and several modifications have been suggested, others will be apparent. Therefore the invention should be unrestricted except as by the appended claims.

The use and operation of my invention are as follows:
The vehicle operator fills the tanks 53, 54 with fluid, such as air, under pressure. The operator then manually operates regulator valves 57, 67, observing indicators 60, 70, to set the fluid pressure in chambers 30 as desired.

While the illustration in FIGURE 3 is schematic, it will be understood that elements 57—60 and 67—70 are, in practice, arranged in a readily accessible and visible location.

Since the system illustrated at 53—63 is entirely separate from that illustrated at 54—73, it will be clear that the operator is thereby enabled to set varying pressures for and between his forward axle to which the forward set of pontoons 4 is connected and his rearward axle to which the rear set of pontoons 4 is connected. Further, the operator is enabled to adjust the pressures employed in chambers 30 in varying relationship with the payload of the vehicle with which the suspension system of my invention is employed.

Should the vehicle, in operation, tend to tilt laterally, an increased compression may be exerted on the four longitudinally aligned chambers 30 on either the right or left hand pair of forward and rear pontoons. The restrictors 63, 73 on that side of the vehicle are effective to dampen and minimize the effect of such excess compression upon the said chambers 30 while at the same time permitting some outward flow of fluid under pressure therethrough.

Rotation of pontoons 4 about the axes of axles 1, 2 is permitted to a limited degre, the bumpers 6, 7 being effective to cushion such rotation. The upper bumper elements 7 and the bumper elements 6 are further effective to receive and support beam 10, directly through contact with I-beam 12 and buffer member 23, when the air chambers 30 are devoid of air and to preclude damage to the deflated member 34 which could occur if the entire weight of the vehicle were allowed to compress the chamber 30 between pontoons 4 and beam 10.

The pontoons 4 have their wings 4b slidably received in plates or hanger brackets 11, 12 and 15 and the said brackets are effective to prevent twisting of axles 1, 2 about a vertical axis.

The captive fluid pressure system schematically illustrated in FIGURE 3 permits the continuous operation of my air suspension system without the necessity for continuous supply of fluid from a pressure source such as the compressor 50, and further without the need for a plurality of transfer or levelling valves necessary for periodic supply of pressure to or rearrangement of pressures within, an air suspension system while the vehicle is in motion.

Further, the captive air system of my invention is completely separate from the normal air pressure system employed with a truck trailer, for example, and is completely separate from the fluid pressure system employed in connection with the brake mechanism thereof.

While the suspension system of my invention provides for the suspension of a trailer body entirely on air throughout its period of vehicle operation, it is clear that, when desired or necessary, the vehicle may be placed in motion even though the air chambers 30 are completely devoid of fluid pressure, the vehicle body then being supported on the bumper elements 6, 7 of the pontoons 4.

I claim:

1. A suspension system for truck-trailers having a pair of tandem axles and a body frame, said system comprising a first pair of pontoon members fixedly secured in spaced parallel relationship to the forwardmost of said axles, a second pair of pontoon members fixedly secured in spaced parallel relationship to the rearmost of said axles, each of said pontoon members having wing portions extending forwardly and rearwardly from its associated axle, each of said pontoon members underlying a longitudinal beam of said body frame, the rearwardly extending wing portions of said first pair of pontoon members extending into end-to-end alignment with the forwardly extending wing portions of said second pair of pontoon members, means depending from said body frame and freely enclosing the adjacent aligned ends of said wing portions so as to permit limited unrelated vertical movement of said aligned ends, brackets depending from said longitudinally extending beams and slidably receiving the forwardly extending wing portions of said first pair of pontoon members and the rearwardly extending wing portions of said second pair of pontoon members, said brackets preventing lateral sway and permitting limited vertical movement of said last mentioned forwardly and rearwardly extending wing portions, radius rods pivotally connecting said brackets with said last mentioned forwardly and rearwardly extending wing portions adjacent said axles and flexible air chamber elements positioned between said longitudinally extending beams and each of said pontoon members.

2. A suspension system for truck-trailers having a pair of tandem axles and a body frame, said system comprising a first pair of pontoon members fixedly secured in spaced parallel relationship to the forwardmost of said axles, a second pair of pontoon members fixedly secured in spaced parallel relationship to the rearmost of said axles, each of said pontoon members having wing portions extending forwardly and rearwardly from its associated axle, each of said pontoon members underlying a longitudinal beam of said body frame, the rearwardly extending wing portions of said first pair of pontoon members extending into end-to-end alignment with the forwardly extending wing portions of said second pair of pontoon members, means depending from said body frame and freely enclosing the adjacent aligned ends of said wing portions so as to permit limited unrelated vertical movement of said aligned ends, brackets depending from said longitudinally extending beams and slidably receiving the forwardly extending wing portions of said first pair of pontoon members and the rearwardly extending wing portions of said second pair of pontoon members, said brackets preventing lateral sway and permitting limited vertical movement of said last mentioned forwardly and rearwardly extending wing portions, radius rods pivotally connecting said brackets with said last mentioned forwardly and rearwardly extending wing portions adjacent said axles and flexible air chamber elements positioned between said longitudinally extending beams and each of said pontoon members, said means including an I-beam extending transversely of said longitudinally extending beams and secured thereto, the web of said I-beam lying between aligned ends of said wing portions, the flanges of said I-beam limiting vertical movement of said aligned ends, and a plate depending from each of said longitudinally extending beams adjacent an end of said I-beam and restraining lateral sway of said aligned ends of said wing portions.

3. The suspension system of claim 2 further characterized by and including bumper elements positioned on each of said pontoon members and extending therefrom between each of said pontoon members and said frame.

4. A suspension system for truck-trailers having a pair of tandem axles and a body frame, said system comprising a first pair of pontoon members fixedly secured in spaced parallel relationship to the forwardmost of said axles, a second pair of pontoon members fixedly secured in spaced parallel relationship to the rearmost of said axles, each of said pontoon members having wing portions extending forwardly and rearwardly from its associated axle, each of said pontoon members underlying a longitudinal beam of said body frame, the rearwardly extending wing portions of said first pontoon members extending into slightly separated end-to-end alignment with the forwardly extending wing portions of said second pair of pontoon members, an I-beam extending transversely of said longitudinally extending beams and secured thereto, the web of said I-beam lying between adjacently aligned ends of said wing portions, the flanges of said I-beam limiting vertical movement of said aligned ends, a plate depending from each of said longitudinally extending beams adjacent an end of said I-beam and restraining lateral sway of said aligned ends of said wing portions, brackets depending from said longitudinally extending beams and slidably receiving the forwardly extending wing portions of said first pair of pontoon members and the rearwardly extending wing portions of said second pair of pontoon members, said brackets permitting limited vertical movement and preventing lateral sway of said last mentioned forwardly and rearwardly extending wing portions, radius rods pivotally connecting said brackets with said last mentioned forwardly and rearwardly extending wing portions adjacent said axles, a pair of flexible air chamber elements positioned between said longitudinally extending beams in each of said pontoon members, a first fluid pressure source, fluid pressure conduit means connecting said first fluid pressure source with each pair of flexible air chamber elements positioned between said longitudinally extending beams and said first pair of pontoon members, a second fluid pressure source, fluid pressure conduit means connecting said second source of fluid pressure with each pair of flexible air chamber elements positioned between said longitudinally extending beams and said second pair of pontoon members, individually regulated valves in each of said conduits and a common fluid pressure supply for each of said sources.

References Cited in the file of this patent

UNITED STATES PATENTS

| | | |
|---|---|---|
| 820,707 | Downer | May 15, 1906 |
| 2,575,064 | Merry | Nov. 13, 1951 |
| 2,814,480 | Clark | Nov. 26, 1957 |
| 2,879,076 | Stricker | Mar. 24, 1959 |
| 2,879,077 | Chalmers | Mar. 24, 1959 |
| 2,882,068 | Faiver | Apr. 14, 1959 |
| 2,891,786 | Norrie | June 23, 1959 |
| 2,896,964 | Cornwall | July 28, 1959 |
| 2,901,242 | Elliott | Aug. 25, 1959 |
| 2,941,816 | Benson | June 21, 1960 |